United States Patent [19]

Birkenbach et al.

[11] 4,354,581

[45] Oct. 19, 1982

[54] MECHANICAL ACTUATING DEVICE FOR A DISC BRAKE

[75] Inventors: Alfred Birkenbach, Hattersheim; Helmut Franke, Wehrheim, both of Fed. Rep. of Germany

[73] Assignee: ITT Industries, Inc., New York, N.Y.

[21] Appl. No.: 201,883

[22] Filed: Oct. 29, 1980

[30] Foreign Application Priority Data

Nov. 20, 1979 [DE] Fed. Rep. of Germany ....... 2946850

[51] Int. Cl.³ ............................................. F16D 65/56
[52] U.S. Cl. ............................ 188/71.9; 188/196 BA
[58] Field of Search ................... 188/71.9, 72.7–72.9, 188/196 P, 196 BA

[56] References Cited

U.S. PATENT DOCUMENTS

| | | | |
|---|---|---|---|
| 2,949,173 | 8/1960 | Peras | 188/71.9 X |
| 3,211,263 | 10/1965 | Harrison | 188/71.9 X |
| 3,952,844 | 4/1976 | Newstead et al. | 188/72.8 |
| 4,278,152 | 7/1981 | Tosi | 188/72.8 X |

Primary Examiner—Duane A. Reger
Attorney, Agent, or Firm—John T. O'Halloran; Alfred C. Hill

[57] ABSTRACT

An adjustable brake-actuating device of the spindle and nut type eliminating need of an adjusting thread includes an actuating nut driven by an actuating lever through a one-way clutch, which opens during the release stroke of the lever, and a clutch-spring encircling the actuating nut to limit the release movement of the actuating nut to an amount corresponding to the desired brake pad clearance.

14 Claims, 3 Drawing Figures

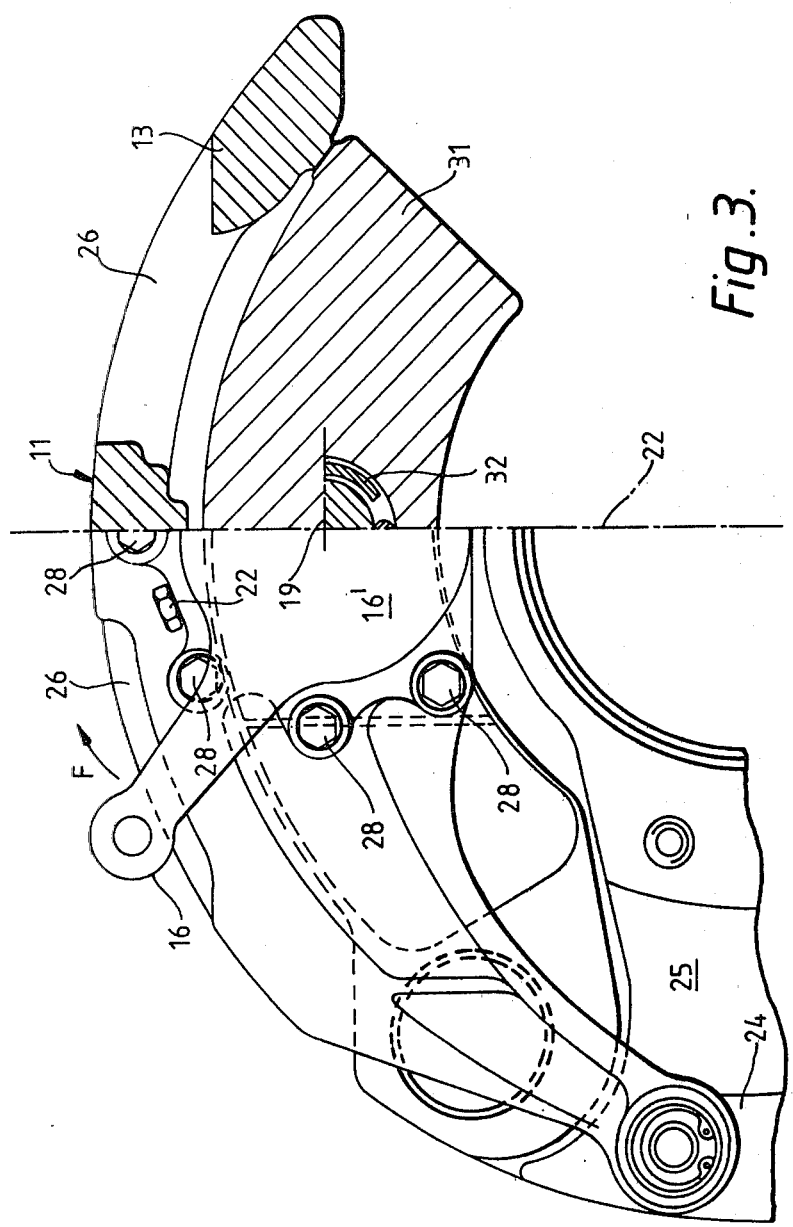

MECHANICAL ACTUATING DEVICE FOR A DISC BRAKE

BACKGROUND OF THE INVENTION

The present invention relates to a mechanical actuating device for a spot-type disc brake comprising a caliper embracing a brake disc inwardly or outwardly, at least one leg of which includes an actuating spindle extending axially therein and an actuating nut cooperating therewith, the actuating spindle and actuating nut acting on the adjacent brake shoe upon a relative rotation with respect to each other by means of an actuating means biased to its initial position and an adjusting device for an automatic adjustment of the appropriate clearance between brake shoe and brake disc after a braking operation. The present invention relates in particular to a special construction of a floating caliper brake, i.e., the so-called fist-type caliper brake, in which one single bridge encompasses the brake disc in a fist-like manner.

Known spot-type floating-caliper disc brakes (German Patents DE-AS No. 1,575,996 and DE-AS No. 1,257,603) are always equipped with special adjusting spindles or special adjusting threads for performing the automatic adjustment in the case of the brake pads being worn.

SUMMARY OF THE INVENTION

In contrast to this, it is an object of the present invention to provide a mechanical actuating device for a spot-type disc brake of the type preferred to hereinabove, in particular, for a fist-type caliper brake, in which the necessity of using a special adjusting spindle with adjusting nut and with a special adjusting thread is obviated. In addition, the brake distinguishes itself by a small mounting space, a small number of components, high efficiency and a simple construction. The principal construction of the caliper of a hydraulic fist-type caliper brake is maintained to a large extent with respect to the brake support member, the brake shoes and the guidance arrangement.

A feature of the present invention is the provision of a mechanical actuating device for a spot-type disc brake comprising a brake caliper embracing a brake disc, the caliper including an axial bore in a leg thereof, the axial bore having a longitudinal axis parallel to an axis of rotation of the brake disc; an actuating spindle disposed in the axial bore coaxial of the longitudinal axis acting against a given brake shoe of the disc brake, the spindle being secured against rotation relative to the given brake shoe; an actuating nut disposed in the axial bore coaxial of the longitudinal axis and surrounding the spindle, the nut being axial immovable and rotatable relative to the spindle; an actuating means disposed coaxial of the longitudinal axis and surrounding the nut in a driving relationship therewith; and an adjusting device for an automatic adjustment to maintain a nominal clearance between the given brake shoe and the brake disc after a braking operation, the adjusting device being disposed between the actuating means and the nut such that the nut is turned back a correspondingly smaller distance than normal when the nominal clearance is exceeded after a braking operation enabling a relative rotation between the actuating means and the nut as the actuating means returns to its initial position prior to the braking operation.

Consequently, the idea of the invention is that the relative rotation occurring in case of the normal brake operation between the actuating spindle and the actuating nut is at the same time utilized for executing the brake pad clearance adjustment by turning the adjusting nut back by a correspondingly smaller distance after the braking operation in the event the nominal brake pad clearance is exceeded. The actuating means will nevertheless always be guided back to its initial position so that it is permitted to brake the disc in an unaltered way when being actuated anew.

An advantageous construction of the present invention is characterized in that a clutch device with a clearance corresponding to the nominal brake pad clearance is provided between the actuating nut and the caliper leg, which clutch device joins in the rotation of the actuating nut within the predetermined nominal brake pad clearance in the clamping or braking direction starting from a first stop. In addition to this, however, the clutch device is held by a second stop and is turned relative to the actuating nut until the brake shoes abut the brake disc. The clutch device also joins in the rotation of the actuating nut within the predetermined nominal brake pad clearance in the release direction starting from the second stop, which is then, however, held by the first stop and does not permit any further rotation of the actuating nut. The clutch device is a one-way clutch inserted between the actuating means and the actuating nut, which one-way clutch locks in the clamping or braking direction and permits in the release direction a rotation of the actuating means relative to the actuating nut. While a one-way clutch is desired to be located in between the actuating means and the actuating nut for transmitting the substantial actuating forces during the braking operation of the brake (the one-way clutch is loaded in the locking direction in this case), a friction element located in friction contact on the actuating nut will suffice as the simplest means of a clutch device, although even in this case a clutch device will be preferred which operates at least in the manner of a one-way clutch.

It is particularly advantageous to have the actuating nut adapted to be turned against the force of a spring in the braking direction, with the spring acting suitably between the leg of the fist-type caliper and the clutch device. This way, the actuating nut will always be reset to the position determined by the first stop, independent of the resetting of the actuating means which is also provided. Because the one-way clutch is located between the actuating means and the actuating nut, the return spring is not able to guarantee this with respect to the actuating means.

However, there is an embodiment possible, in which the one-way clutch is provided, in its free-wheeling direction of rotation, with such an amount of basic friction that the spring force resetting the actuating means entrains the actuating nut until the clutch device comes to rest at the first stop in the release direction. For this purpose, a friction clutch could be located between the actuating means and the actuating nut.

The return spring for the actuating nut is preferably a leg spring surrounding the actuating nut.

In a particularly advantageous embodiment, the clutch device is a one-way clutch represented by a nut-encircling spring which saves space.

BRIEF DESCRIPTION OF THE DRAWING

Above-mentioned and other features and objects of this invention will become more apparent by reference to the following description taken in conjunction with the accompanying drawing, in which:

FIG. 3 is a view in the direction of the arrow IIIa in FIG. 1 shown on the left-hand side of the vertical radical median plane 22 and a section taken along the line IIIa—IIIa in FIG. 1 shown on the right-hand side of the plane 22.

DESCRIPTION OF THE PREFERRED EMBODIMENT

Figure 1:
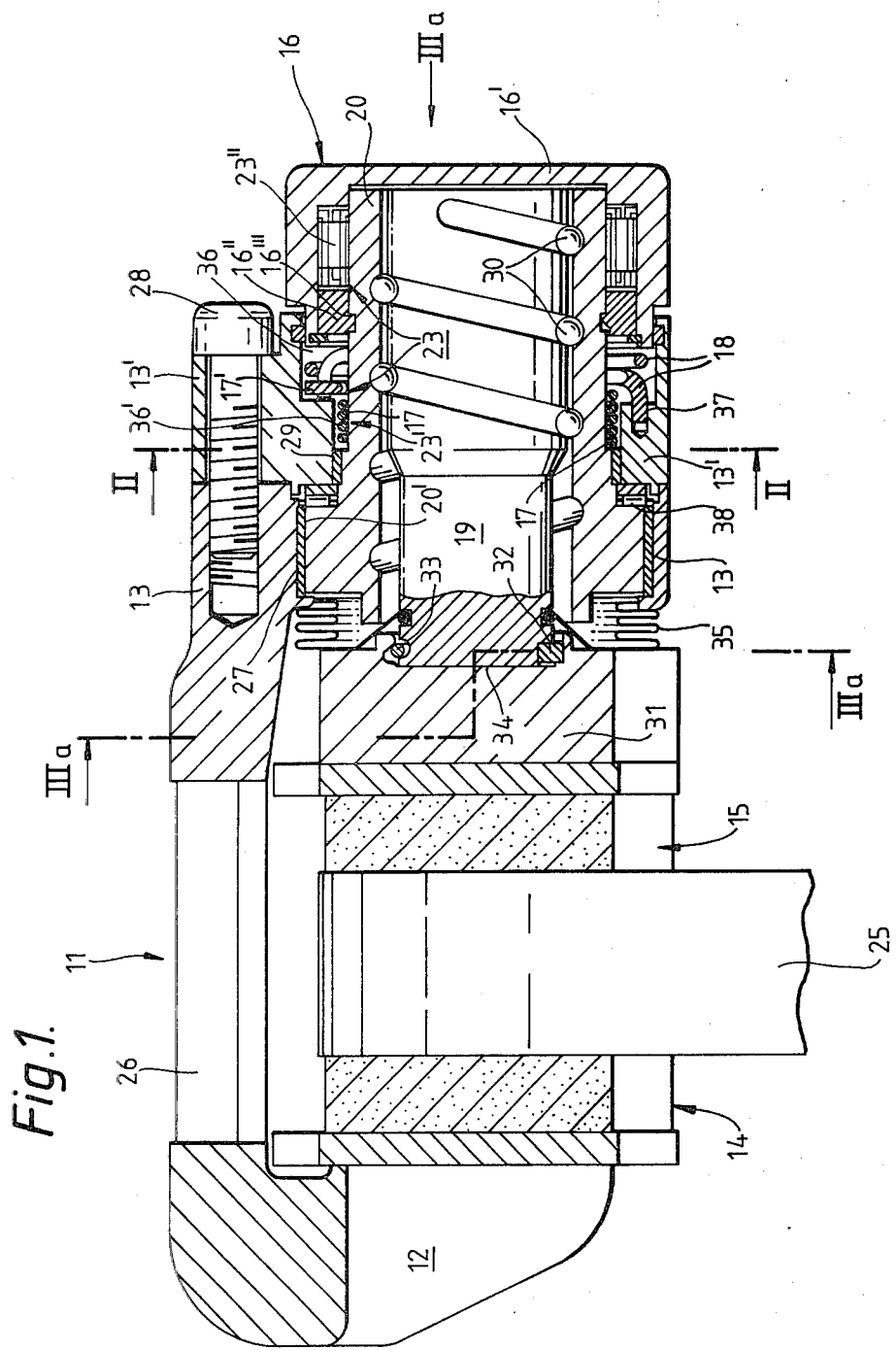
FIG. 1 is a longitudinal cross sectional view of a mechanically actuated spot-type fist-type caliper disc brake in accordance with the principles of the present invention.

According to the FIGS. 1 and 3, the fist-type caliper 11 is held axially movably on a brake support member 24.

According to FIG. 1, brake caliper 11 incorporating the radial openings 26 embraces the brake disc 25 outwardly and extends into a leg 12 which carries the outer brake shoe 14.

The inner leg 13 of caliper 11 includes a cylindrical axial bore 27 in which a bearing bushing is provided as a pivot bearing for an actuating nut 20. In this respect, actuating nut 20 has in its front area a first cylindrical circumferential surface 20' with a comparatively large diameter.

A cover 13' is fitted axially on leg 13 and screwed on by means of bolts 28. Cover 13' has a central opening through which a step-like portion of actuating nut 20 extends outwardly.

Subsequent to the annular step of actuating nut 20, another pivot bearing 29 for actuating nut 20 is provided at cover 13'. An axial roller bearing 38 at the annular step of actuating nut 20, incorporated between the opening of cover 13' and bore 27 of leg 13, provides for the transmitting of the brake's clamping forces to fist-type caliper 11.

Actuating nut 20 is seated on and coaxial to an actuating spindle 19. Actuating nut 20 and spindle 19 are interconnected by an easily passable ball bearing thread 30 with an internal ball guide return tube. The end surface of spindle 19 adjacent brake disc 25 communicates with an intermediate plate 31 and are locked to each other in a manner to prevent rotational movement and to be axially immovably relative to each other. Intermediate plate 31 acts on its part on inner brake shoe 15. The connection between spindle 19 and intermediate plate 31 to prevent rotational movement may be effected by an adjusting spring 32 or a suitable O-shaped ring 33. These components will be arranged in corresponding recesses at the end portion of spindle 19 or in an indentation 34 of intermediate plate 31.

A bellows-like diaphragm 35, inserted between leg 13 and spindle 19, seals the interior of the actuating mechanism from outside contaminants.

By turning actuating nut 20, spindle 19 together with intermediate plate 31 may be displaced towards or away from brake disc 25.

For execution of these rotations, the following measures may be taken. A lever 16 (FIG. 3) representing the actuating means and a cap 16' are constructed in one piece. Cap 16' is radially spaced from and encompasses the end portion of actuating nut 20 remote from brake disc 25. A ring 16" serves to guide cap 16' and to fasten it in the axial direction on actuating nut 20. Ring 16" may be made of plastics or of metal. When being made of metal, it is preferably slit. Cap 16' together with ring 16" will be moved onto the end portion of actuating nut 20, until ring 16" engages in the circumferential groove 16''' in actuating nut 20. Located between cap 16' and actuating nut 20 is a space defined by the inner end surface of cap 16' and of ring 16" is a one-way clutch 23", which locks in the brake's clamping or actuating direction when lever 16 is acted upon and which permits a rotation of cap 16' relative to actuating nut 20 in the opposite direction by overcoming a frictional resistance, if necessary.

In an annular chamber 36 provided between cover 13', actuating nut 20 and cap 16', a one-way clutch 23' represented by a nut-encircling spring is arranged, which locks or releases in the opposite direction compared with one-way clutch 23". The one-way clutch 23' includes a nut-encircling spring 17 which tightly encircles the outer surface of actuating nut 20 and which includes a first end portion 17' (FIG. 1) projecting radially in annular chamber 36. The greater part of nut-encircling spring 17 extends from the comparatively wide annular chamber 36 to a narrowed annular chamber area 36', which is just sufficient for accommodation of nut-encircling spring 17 and which is according to FIG. 2 surrounded by a sector-shaped groove 39, into which a second end portion 17" of the encircling spring 17 projects radially. According to FIGS. 1 and 2, an axially branched-off end portion of leg spring 18 abuts behind first end portion 17' of nut-encircling spring 17, leg spring 18 being likewise located in the wide annular chamber 36 and being fastened by the other branched-off end portion in cover 13' in the position indicated by reference numeral 37 after being wound around actuating nut 20 one and a half times.

Figure 2:
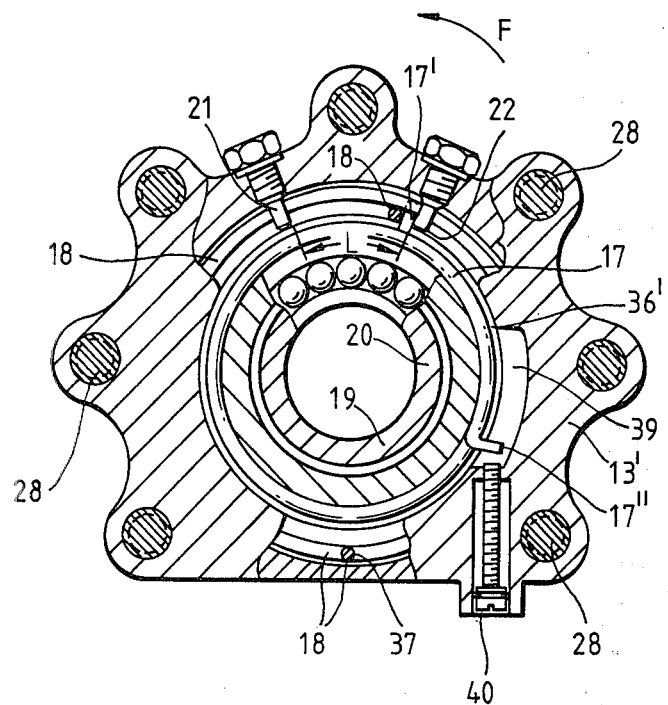
FIG. 2 is a transverse cross sectional view taken along the line II—II of FIG. 1.

According to FIGS. 1 and 2, the movement of end portion 17' of nut-encircling spring 17 including the end portion of leg spring 18 in engagement with end portion 17' is confined by two stops 21 and 22, which are screwed radially from the outside into cover 13' at an angular distance therebetween determining the brake pad clearance. Between stops 21 and 22, end portion 17' of nut-encircling spring 17 is allowed to cover a distance L (brake pad clearance).

According to FIG. 2, a stop pin 40 is screwed into housing cover 13' approximately tangentially, pin 40 corresponding with the second radially branched-off end portion 17" of nut-encircling spring 17. End portion 17" is guided in groove 39 of cover 13', the arc length of which groove is dimensioned such that end portion 17" is able to execute a greater angular movement than end portion 17' between stops 21 and 22. Under normal operation of the adjusting device, end portion 17" does not abut pin 40 or cover 13' in the circumferential direction, so that the operation of nut-encircling spring 17 is determined solely by end portion 17' bearing against stops 21 and 22.

One-way clutch device 23' and one-way clutch 23" form the adjusting device 23, the operation of which will be described in the following.

When lever 16 is actuated in the direction of the arrow F in FIGS. 2 and 3, one-way clutch 23" will lock so that cap 16' and actuating nut 20 are locked to each other against relative rotational movement. Now actuating nut 20 turns clockwise in the view of FIG. 3 and in doing so advances actuating spindle 19, intermediate plate 31 and brake shoe 15 in the direction of brake disc 25.

The nut-encircling spring 17 with its end portion 17' will join in this rotational movement of actuating nut 20 due to the friction between spring 17 and the outer surface of actuating nut 20. The branched-off end portion of leg spring 18 is entrained by end portion 17' upon this movement and consequently leg spring 18 is loaded. The friction of nut-encircling spring 17 on the outer surface of actuating nut 20 and the dimension of leg spring 18 have to be coordinated such that a slipping of nut-encircling spring 17 on actuating nut 20 will not occur during this movement.

As long as the predetermined nominal brake pad clearance is prevailing between brake shoes 14 and 15 and brake disc 25, end portion 17' of nut-encircling spring 17 will move together with actuating nut 20 only for that period of time until the branched-off end portion of leg spring 18 abuts at stop 21. However, if the nominal clearance is exceeded, actuating nut 20 will continue to rotate after the branched-off end portion of leg spring 18 has abutted stop 21, with a relative rotation occurring between actuating nut 20 and nut-encircling spring 17 locked at that point of time at stop 21.

Now if the clamping or braking force decreases (brake released), leg spring 18 will turn back actuating nut 20, since actuating nut 20 is in frictional engagement with nut-encircling spring 17 and leg spring 18 is in engagement with end portion 17' of nut-encircling spring 17. Due to this, actuating lever 16 will move back, too, on account of one-way clutch 23" still being locked at this moment.

If end portion 17' of nut-encircling spring 17 abuts with stop 22 when moving back, this implies the resetting of actuating nut 20 has terminated. Thus, the nominal clearance has now been reestablished in its full extent. However, since actuating lever 16 is still subjected to the force biasing actuating lever 16 into its initial position, one-way clutch 23" is released and permits a corresponding movement of actuating lever 16 relative to actuating nut 20. The adjusting step has been completed now, and the brake's cycle of operations may start anew. The spring biasing actuating lever 16 in its initial position is not illustrated in the drawing.

As can be seen from the foregoing, an advantage of the present invention is that the nominal brake pad clearance is completely reestablished immediately after every adjusting step.

For resetting actuating spindle 19 to fit new brake pads, stop pin 40 is screwed into groove 39 far enough so that pin 40 displaces end portion 17" counterclockwise by an angle which is greater than the angle of rotation of end portion 17' confined by stops 21 and 22. Because of this, the seating of the nut-encircling spring 17 on actuating nut 20 is loosened, so that actuating nut 20 is no longer prevented by nut-encircling spring 17 from rotating clockwise as shown in FIG. 2. The resetting of actuating spindle 19 may then take place in such a manner, that cap 16' and actuating nut 20 are connected to each other to prevent relative rotational movement by a screw not illustrated in the drawing. Actuating spindle 19, intermediate plate 31 and brake shoe 15 are now able to be reset to the initial position without any difficulty by turning actuating lever 16 clockwise. Thus, the resetting of the fist-type caliper brake in accordance with the construction of the present invention is possible in an extremely simple way.

The resetting of the adjusting device may also be accomplished by screwing stop pin 40 into groove 39 far enough so that end portion 17' does not abut against stop 22 resulting in nut-encircling spring 17 bearing solely against pin 40 at end portion 17" in the clockwise direction of FIG. 2. The rotation of actuating nut 20 clockwise and, thus, in the brake release direction would then be possible even against the friction resistance of nut-encircling spring 17.

In principle, a friction force of one-way clutch 23" could replace leg spring 18 in the free-wheeling direction of clutch 23'. In this modification of the invention, the resetting of the adjusting device could also be carried out by loosening stop screws 21 and 22, since the rotation of nut-encircling spring 17 will not be inhibited by leg spring 18 in this case. End portion 17" of spring 17 and groove 39 would then be likewise dispensed with.

While we have described above the principles of our invention in connection with specific apparatus, it is to be clearly understood that this description is made only by way of example and not as a limitation to the scope of our invention as set forth in the objects thereof and in the accompanying claims.

We claim:

1. A mechanical actuating device for a spot-type disc brake comprising:

a brake caliper embracing a brake disc, said caliper including an axial bore in a leg thereof, said axial bore having a longitudinal axis parallel to an axis of rotation of said brake disc;

an actuating spindle disposed in said axial bore coaxial of said longitudinal axis acting against a given brake shoe of said disc brake, said spindle being secured against rotation relative to said given brake shoe;

an actuating nut disposed in said axial bore coaxial of said longitudinal axis and surrounding said spindle, said nut being axial immovable and rotatable relative to said spindle;

an actuating means disposed coaxial of said longitudinal axis and surrounding said nut in a rotational driving relationship therewith; and an adjusting device for an automatic adjustment to maintain a nominal clearance between said given brake shoe and said brake disc after a braking operation, said adjusting device being disposed between said actuating means and said nut such that said nut is turned back a correspondingly smaller distance than normal when said nominal clearance is exceeded after a braking operation enabling a relative rotation between said actuating means and said nut as said actuating means returns to its initial position prior to said braking operation.

2. An actuating device according to claim 1, wherein said adjusting device includes a clutch device disposed between said actuating means and said nut having a circumferential distance L between first and second stops corresponding to said nominal clearance, said clutch device rotating with said nut from said first stop to said second stop in a braking direction, said clutch device being held by said second stop when said nominal clearance is exceeded and rotated relative to said nut until said given brake shoe abuts said brake disc, said clutch device rotating with said nut from said second stop to said first stop in a brake release direction opposite said braking direction and held by said first stop to prevent further rotation of said nut, and a one-way clutch disposed between said actuating means and said nut to lock said actuating means and said nut together in said braking direction and to enable a relative rotation between said actuating means and said nut in said release direction.

3. An actuating device according to claim 2, wherein said nut is rotated in said braking direction against the force of a first spring.

4. An actuating device according to claim 3, wherein said first spring is disposed between said leg and said clutch device.

5. An actuating device according to claims 3 or 4, wherein
said first spring is a leg spring.

6. An actuating device according to claim 5, wherein said clutch device is a second spring operating as a one-way clutch.

7. An actuating device according to claim 6, wherein said second spring tightly encircles the outer surface of said nut and includes a first end portion disposed between said first and second stops in a cooperating relationship with one end portion of said first spring.

8. An actuating device according to claim 7, wherein said second spring includes a second end portion projecting radially into a circumferential groove disposed in a wall of said axial bore, said groove having an arc length greater than L to enable said second end portion to execute a greater angular motion than said first end portion between said first and second stops.

9. An actuating device according to claim 8, further including
a screwable stop pin disposed in said wall capable of being screwed into one end of said groove for engagement with said second end portion, said stop pin being moved in said groove in engagement with said second end portion a first given distance to cause said first end portion to disengage from said second stop.

10. An actuating device according to claim 9, wherein
said stop pin is moved in said groove in engagement with said second end portion a second given distance greater than said first given distance to loosen contact between said second spring and the outer surface of said nut.

11. An actuating device according to claim 2, wherein
said clutch device includes a spring tightly encircling the outer surface of said nut having a first end portion disposed between said first and second stops.

12. An actuating device according to claim 11, wherein
said spring includes a second end portion projecting radially into a circumferential groove disposed in a wall of said axial bore, said groove having an arc length greater than L to enable said second end portion to execute a greater angular motion than said first end portion between said first and second stops.

13. An actuating device according to claim 12, further including
a screwable stop pin disposed in said wall capable of being screwed into one end of said groove for engagement with said second end portion, said stop pin being moved in said groove in engagement with said second end portion a first given distance to cause said first end portion to disengage from said second stop.

14. An actuating device according to claim 13, wherein
said stop pin is moved in said groove in engagement with said second end portion a second given distance greater than said first given distance to loosen contact between said second spring and the outer surface of said nut.

* * * * *